United States Patent [19]

Lejeune

[11] 4,067,375

[45] Jan. 10, 1978

[54] BEAD CORE HAVING OPPOSITELY TWISTED BEAD RINGS

[75] Inventor: Daniel Lejeune, Clermont-Ferrand, France

[73] Assignee: Compagnie Generale des Etablissements Michelin, France

[21] Appl. No.: 653,126

[22] Filed: Jan. 28, 1976

[30] Foreign Application Priority Data

Jan. 29, 1975 France ................................ 75.02871

[51] Int. Cl.² ........................................... B60C 15/04
[52] U.S. Cl. .................................. 152/362 R; 57/139; 152/356 R; 152/359
[58] Field of Search ............. 152/362 R, 362 CS, 354, 152/356, 358, 359; 245/1.5; 57/139, 144, 145

[56] References Cited

U.S. PATENT DOCUMENTS

| 3,217,778 | 11/1965 | Kovac et al. | 152/359 |
| 3,233,648 | 2/1966 | Kovac et al. | 152/359 |
| 3,736,974 | 6/1973 | LeJeunne | 152/362 R |
| 3,861,442 | 1/1975 | Bertrand | 152/362 R |

Primary Examiner—Robert B. Reeves
Assistant Examiner—Fred A. Silverberg
Attorney, Agent, or Firm—Brumbaugh, Graves, Donohue & Raymond

[57] ABSTRACT

The fatigue strength of a composite bead ring for pneumatic tires formed of at least two unitary stranded bead rings in tangential contact with each other is increased by having oppositely directed stranding or twisting of the peripheral layers of the wires of said two unitary stranded bead rings.

4 Claims, 5 Drawing Figures

BEAD CORE HAVING OPPOSITELY TWISTED BEAD RINGS

The present invention relates to improvements in pneumatic tires. More particularly, it relates to improvements in the beads of pneumatic tires, said pneumatic tires being hereinafter referred to as "tires."

A tire is formed of a crown with a tread and, on either side of this crown, a sidewall which terminates in a bead. The beads assure the seating and, in the case of a tubeless tire, the sealing of the tire on the wheel rim. A reinforcement of the tire extends down into the beads. In the beads this reinforcement comprises at least one carcass ply and at least one bead ring to which the said carcass ply is anchored, for instance, by being turned around it.

There are two types of bead rings. The bead rings of the first type are made by the circular winding of one or more metal wires around a form. Such bead rings are described, for example, in U.S. Pat. No. 1,194,040. The bead rings of the second type are obtained by the helical winding of one or more metal wires. Such bread rings, described for example in British Pat. No. 187,955, have the advantage of having a higher resistance to rupture than the bead rings of the first type for the same cross section of metal. However, the bead rings of the second type are less resistant to torsion than those of the first type. In the rest of this specification and in the claims the bead rings of the second type will be referred to as "stranded bead rings."

In certain cases, particularly in tires of the radial carcass type, and more particularly in tubeless tires of the radial carcass type, it is preferred to use, instead of a bead ring of the first type or instead of one stranded bead ring having a large cross section of metal, at least two stranded bead rings. One thus forms a composite bead ring formed of at least two unitary stranded bead rings juxtaposed and in contact with each other.

One drawback of such an arrangement results from the fact that in order to reduce the cost one uses unitary stranded bead rings, the layers of wires of which, and particularly the peripheral layers, are stranded or twisted in the same direction. Such a mutual arrangement of the said unitary stranded bead rings results in a loss of fatigue resistance of said composite bead ring.

The tire in accordance with the present invention comprising a carcass reinforcement anchored in the bead by being turned around a composite bead ring formed of at least two unitary stranded metallic bead rings which, seen in radial section, are in tangential contact with each other, is characterized by the fact that the direction of stranding or twisting of the peripheral layer of the wires of one unitary stranded bead ring is opposite the direction of stranding or twisting of the peripheral layer of the wires of the other unitary stranded bead ring.

By means of the present invention, a substantial improvement is obtained in the fatigue resistance of the composite bead rings. This fatique resistance manifests itself by the delay which is noted with respect to the appearance of ruptures of the wires of the unitary stranded bead rings. This increase in fatigue resistance is attributed to the decrease in the local pressures prevailing between the wires of the peripheral layers of the unitary stranded bead rings in contact with each other. As a matter of fact, the wires of the said peripheral layers, instead of intersecting at a large angle, intersect at a rather small angle and, in the most favorable case, are parallel in the zone of contact.

The present invention applies in particular to composite bead rings of the triangulated type such as those described in French Pat. No. 2,082,484. Such composite bead rings are formed of three unitary bead rings which are tangent to each other, at least two of said unitary bead rings being stranded bead rings. When such a composite bead ring is formed of three unitary stranded bead rings, it is preferable, in accordance with the present invention, for the peripheral layers of each of the two unitary stranded bead rings closest to the bead seat to be stranded or twisted in the same direction and for the peripheral layer of the third unitary stranded bead ring to be stranded or twisted in the opposite direction. Preferably, furthermore, the wires of the peripheral layers are stranded or twisted in tangential contact with each other, whatever the number of unitary stranded bead rings contained in the said triangulated composite bead ring.

The accompanying drawing illustrates nonlimitative examples of the invention. In the drawing.

Figure 1:
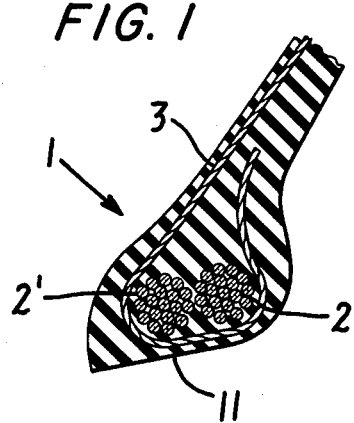
FIG. 1 shows two unitary stranded bead rings arranged in accordance with the invention in a bead of a tire with a radial carcass ply.
Figure 5:
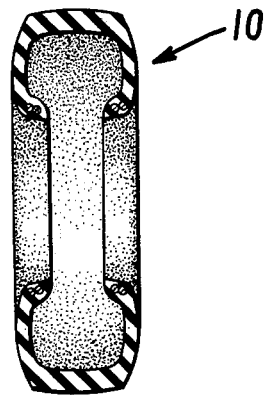
FIG. 5 illustrates schematically, in radial section, a tire whose beads contain bead rings in accordance with the present invention.

FIG. 1 shows a bead 1 of a tire 10 which has been shown in its entirety in FIG. 5. In this bead, there are arranged two unitary stranded bead rings 2 and 2' in direct contact with each other. Around these two stranded bead rings there is wrapped a carcass ply composed of cords 3.

Figure 2:
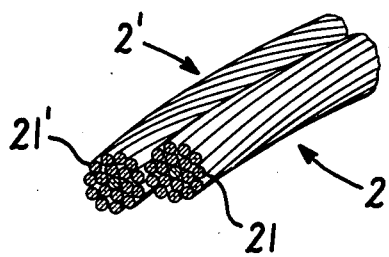
FIG. 2 is a perspective veiw of a portion of the two unitary stranded bead rings of FIG. 1.

As can be noted from FIG. 2, the direction of stranding or twisting of the peripheral layer 21 of the metal wires of the bead ring 2 is opposite, in accordance with the invention, the direction of stranding or twisting of the peripheral layer 21' of the metal wires of the bead ring 2'.

Figure 3:
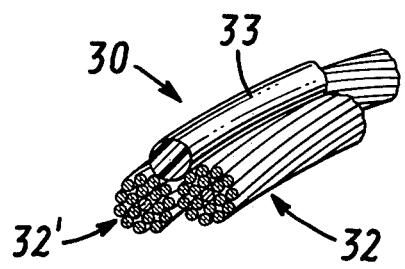
FIG. 3 shows a composite bead ring of thetriangulated type, two unitary bead rings of which are stranded bead rings.

In the embodiment illustrated in FIG. 3, the composite bead ring 30 is of the triangulated type as described in French Pat. No. 2,082,484 and is composed, on the one hand, of two unitary stranded bead rings 32 and 32' which are similar to the bead rings 2 and 2' of FIG. 2, particularly with respect to the opposite directions of stranding or twisting and, on the other hand, a third bead ring 33 formed of a large wire of synthetic material imbedded between the two bead rings 32 and 32' on the outside of the latter. This bead ring 33 has a somewhat larger diameter than the diameter of the two unitary stranded bead rings 32 and 32', calculated so that said bead ring 33 is in contact along its circumference with said two unitary stranded bead rings 32 and 32'.

Figure 4:
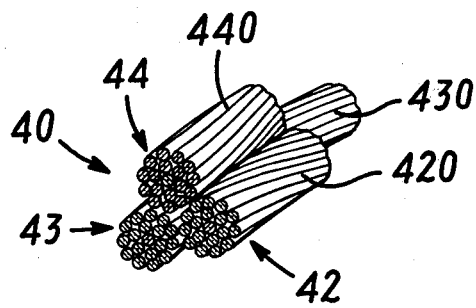
FIG. 4 shows a composite bead ring formed of three unitary stranded bead rings, the peripheral layers of which are formed of wires in contact.

The composite bead ring 40 illustrated in FIG. 4 comprises three unitary stranded bead rings 42, 43 and 44. In accordance with the invention, the wires 420 and 430 of the peripheral layers of the unitary stranded bead rings 42 and 43, whose diameter is smaller than that of the unitary stranded bead ring 44 and which therefore are closer than the latter to the bead seat 11 of the bead 1 of the tire (See FIG. 1), are stranded or twisted in the same direction, while the wires 440 of the peripheral layer of the unitary stranded bear ring 44 are stranded or twisted in the opposite direction.

What is claimed is:

1. A pneumatic tire with a bead seat and whose bead reinforcement comprises at least two metallic unitary bead rings forming a composite bead ring around which a carcass reinforcement is anchored, the said unitary bead rings being stranded bead rings and being, as seen in radial section, in tangentail contact with each other, characterized by the fact that the said unitary stranded bead rings each comprise a peripheral layer of wires stranded or twisted in opposite direction from the peripheral layer of wires of the other unitary stranded bead ring.

2. The pneuamtic tire according to claim 1 whose bead reinforcement comprises three unitary bead rings forming a composite bead ring around which the carcass reinforcement is anchored, characterized by the fact that each of the unitary bead rings, as seen in radial section, is in tangentail contact with the other two.

3. The pneumatic tire according to claim 2, characterized by the fact that the composite bead ring is formed of three unitary stranded bead rings and by the fact that the two unitary stranded bead rings closest to the bead seat each comprise a peripheral layer of wires stranded or twisted in the same direction as the peripheral layer of wires of the other.

4. The pneumatic tire according to claim 1, characterized by the fact that the said peripheral layers are all formed of wires in tangential contact with each other.

* * * * *